United States Patent [19]
van Vuuren et al.

[11] Patent Number: 4,928,640
[45] Date of Patent: May 29, 1990

[54] AUTOCALIBRATION OF CAMSHAFT PHASING FEEDBACK IN A VARIABLE VALVE TIMING SYSTEM

[75] Inventors: Willem N. J. van Vuuren, Williamsburg; Russell J. Wakeman, Newport News, both of Va.

[73] Assignee: Siemens-Bendix Automotive Electronics L.P., Troy, Mich.

[21] Appl. No.: 383,385

[22] Filed: Jul. 20, 1989

[51] Int. Cl.⁵ .................................... F01L 1/34
[52] U.S. Cl. ........................ 123/90.17; 123/90.31
[58] Field of Search .............. 123/90.15, 90.16, 90.17, 123/90.31

[56] References Cited

U.S. PATENT DOCUMENTS

| | | | |
|---|---|---|---|
| 3,986,484 | 10/1976 | Dyer | 123/90.16 |
| 4,009,695 | 3/1977 | Ule | 123/90.13 |
| 4,481,912 | 11/1984 | Stwiorok et al. | 123/90.15 |
| 4,584,974 | 4/1986 | Aoyama et al. | 123/90.16 |
| 4,615,306 | 10/1986 | Wakeman | 123/90.16 |
| 4,754,727 | 7/1988 | Hampton | 123/90.15 |
| 4,856,465 | 8/1989 | Denz et al. | 123/90.15 |

Primary Examiner—Charles J. Myhre
Assistant Examiner—Weilun Lo
Attorney, Agent, or Firm—George L. Boller; Russel C. Wells

[57] ABSTRACT

Autocalibration of the camshaft phasing sensor of a closed-loop variable valve timing system of an internal combustion engine. The camshaft phasing adjustment mechanism comprises a cam that changes the camshaft phasing. This cam is provided with a dwell that occurs at a known true phasing of the camshaft. The cam is commanded to operate to the dwell, and the lack of change in the sensor output indicates when the dwell is reached. At this time the sensor output should exactly indicate the known camshaft phasing that is produced by the adjustment cam dwell. If it does not, the difference is calculated and forms an offset that is algebraically applied to the sensor output thereby calibrating the sensor.

18 Claims, 1 Drawing Sheet

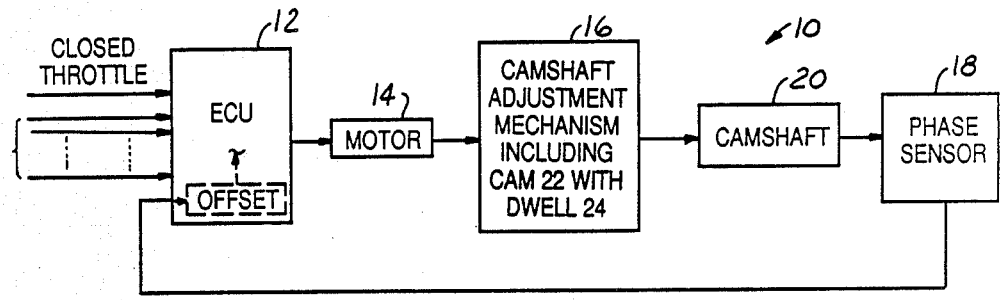
FIG.1
FIG.2
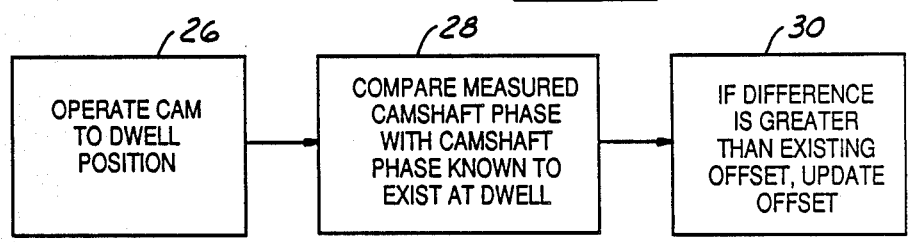
FIG.3
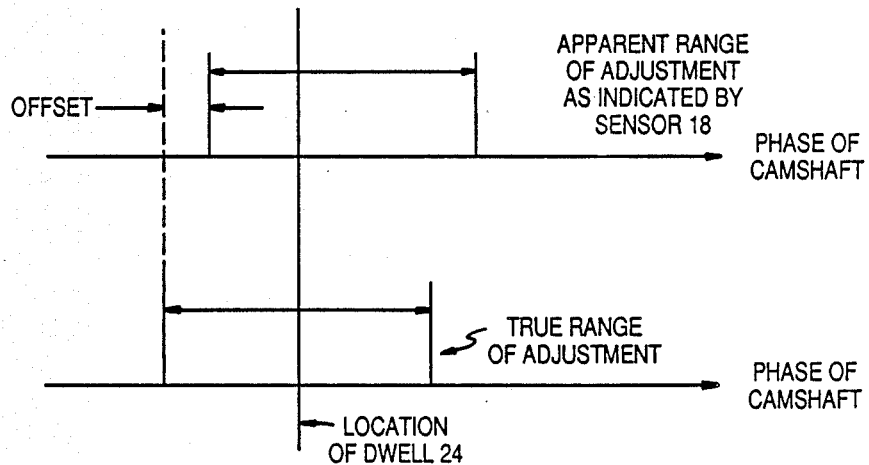

AUTOCALIBRATION OF CAMSHAFT PHASING FEEDBACK IN A VARIABLE VALVE TIMING SYSTEM

BACKGROUND AND SUMMARY OF THE INVENTION

This invention relates generally to a variable valve timing system for an internal combustion engine wherein the phase of an intake and/or exhaust camshaft(s) is adjusted in relation to the engine's crankshaft in order to achieve desired times of valve opening and closing during the engine cycle. More specifically, the invention relates to the autocalibration of camshaft phasing feedback for substantially eliminating discrepancies between apparent camshaft phasing, as measured by a feedback sensor, and the true camshaft phasing that exists by virtue of the mechanism that couples the camshaft to the crankshaft.

An example of a variable valve timing system that operates by adjusting the phasing of a camshaft, or camshafts, relative to the crankshaft is described in U.S. Pat. No. 4,744,338, commonly assigned. Camshaft adjustment is accomplished in a closed-loop manner by means of a mechanical adjustment mechanism that is operated by an electromechanical actuator. The electromechanical actuator is under the control of an electronic control unit (ECU). In order to assure faithful adjustment of the camshafts, a feedback sensor is associated with each camshaft under the ECU's control to provide camshaft phase feedback to the ECU. The closed-loop control that is provided by such feedback enables errors between the commanded phasing and the actual phasing to be nulled out assuming that the system is properly calibrated.

Due to sensor mounting errors, machine tolerances, engine-to-engine variations, etc., there is a certain amount of uncertainty in the cam phasing feedback, and this cannot be nulled out by the closed-loop control. Individual calibration of each sensor is a possible solution, but it is time consuming and expensive in a production application. The present invention relates to a solution that is significantly less time consuming and less expensive. The invention contemplates that the ECU itself will do the calibration with the resulting added benefit that such calibration will be on-going throughout the life of the system so that the effects of any changes in sensor-phasing relationship that occur after initial calibration will also be taken out of the system.

Where the ECU contains a microprocessor-based control, the invention can be readily implemented, mainly in software, although there is a mechanical aspect that must also be incorporated into the adjustment mechanism. In a system of the type contained in the aforementioned patent, the mechanism must be modified so that a short dwell is incorporated into the mechanism's adjusting cam. This dwell is located at a particular location on the cam profile such that when this dwell is acting on the cam follower that is associated with the cam, the camshaft phase is at a known relationship to the crankshaft. As the dwell acts on the cam follower, there is no resulting change in the camshaft phasing, and consequently no change in the sensor output will occur. The ECU detects this lack of phase change, and can therefore detect when the dwell is acting on the cam follower. Since the camshaft phase that exists when the dwell is acting on the cam follower is known, the ECU will know the actual, or true, camshaft phase at the same time that it is receiving the sensor feedback that is supposedly exactly representative of the true camshaft phasing. If the sensor feedback does not correspond to what it should be at this time, then the ECU will know that the sensor feedback is not properly calibrated. The ECU calculates the amount of the discrepancy by subtracting the actual sensor measurement from what it should be, and the result of this calculation becomes an offset that is algebraically added to the feedback from the sensor to create a properly calibrated feedback measurement. This autocalibration routine is programmed to occur at certain times during engine operation so that the accuracy of the feedback measurement is maintained. One way of programming the occurrence of the autocalibration routine is to initiate the routine whenever engine idle (closed throttle) is sensed. If the duration of any idle is sufficiently long, the routine will be completed. The offset is stored in memory associated with the microprocessor, but is updated after the completion of the autocalibration routine only if there is a change in the offset.

The foregoing features, advantages, and benefits of the invention, along with additional ones, will be seen in the ensuing description and claims which should be considered with the accompanying drawings. The drawings disclose principles of the invention according to the best mode contemplated at the present time for a preferred embodiment of the invention.

BRIEF DESCRIPTION OF THE DRAWINGS

FIG. 1 is a block diagram of a variable valve timing system incorporating the autocalibration feature of the invention.

FIG. 2 is a block diagram presenting steps in the autocalibration procedure.

FIG. 3 is an explanatory diagram useful in understanding principles of the invention.

DESCRIPTION OF THE PREFERRED EMBODIMENT

The system 10 that is disclosed in FIG. 1 is generally similar to that contained in Patent No. 4,744,338. It comprises an ECU 12, a motor 14 a camshaft adjustment mechanism 16, and a phase sensor 18, all of which are associated with a camshaft 20 of an internal combustion engine. The camshaft controls valves associated with the engine cylinders. As is well known, an exhaust camshaft controls the exhaust valves and an intake camshaft controls the intake valves. Although only a single camshaft is illustrated as being controlled, it should be understood that more than one camshaft may be controlled by a single adjustment mechanism.

ECU 12 is shown as receiving several inputs. One of these is a closed throttle signal and another is a feedback signal from sensor 18. The ECU provides an output signal that commands a certain operation of motor 14 that is intended to result in a corresponding phasing of camshaft 20. The response of the camshaft is monitored by sensor 18 so that the phasing of the camshaft is close-loop controlled.

Camshaft adjusting mechanism 16 includes a cam 22 that is positioned by motor 14 to set the desired phasing of camshaft 20. The cam profile is designed such that an increment of cam rotation will produce some change in camshaft phasing, except at a dwell 24 that is deliberately designed into the profile at a particular location. When dwell 24 is acting on the associated cam follower, camshaft 20 is operated to a particular known degree of phasing by mechanism 16. At the same time, the feedback signal from sensor 18 should indicate that exact same degree of phasing, within a certain tolerance representing jitter in the feedback system. If the sensor fails to correctly indicate the proper camshaft phasing, then calibration is required. Calibration is performed in the following manner.

As adjustment mechanism 16 brings cam 22 to a setting where dwell 24 acts upon the associated cam follower, the signal from sensor 18 will not change so long as the dwell acts on the follower. This is of course because the action of the dwell on the follower creates no change in the phasing of camshaft 20 even though phasing change is being commanded by ECU 12. This lack of change in the signal from sensor 18 is detected by ECU 12 so that the ECU "knows" that cam 22 is rotating through a range where dwell 24 is acting on the follower. Because the ECU also "knows" the true phasing of camshaft 20 at this time by virtue of the mechanical coupling of the camshaft to the crankshaft via adjusting mechanism 16, the ECU can determine whether the signal from sensor 18 corresponds to the current true phasing of the camshaft. If they are the same, within the jitter tolerance, then the sensor is properly calibrated. However, if they are not, then an offset is added to the feedback signal thereby correcting the feedback signal before it is allowed to be processed by the closed-loop control. The offset is calculated by subtracting the feedback measurement from the true phasing that is known to exist at this condition of the adjusting mechanism 16, and algebraically adding the offset to the feedback signal. The diagram of FIG. 3 illustrates this.

In that FIG. the true range of phasing is equal to the apparent range as provided by sensor 18, but the apparent range is offset to the right. The location of dwell 24 is at a fixed, known location in the true range of phasing. However, in the apparent range of phasing, the dwell appears at a different, and wrong, location in the range. This location is in error by the amount by which the apparent range is offset from the true range. For the dwell to appear at the correct location in the apparent range, the amount of the offset must be added to the sensor signal. Similarly, if the apparent range were offset to the left from the true range, then the offset would be subtracted from the sensor signal. As can be seen in FIG. 1, the offset is applied to the sensor feedback signal before the sensor signal is processed by the closed-loop control, and therefore the error is taken out of the system.

FIG. 2 is a block diagram illustrating the general steps 26, 28, and 30 that are carried out in performing the autocalibration.

The invention can be readily implemented. The only hardware modification that is required to the system shown in Pat. No. 4,744,338 is to incorporate the dwell into the adjusting cam of the adjusting mechanism. Other modifications are incorporated in the electronics and software.

While a presently preferred embodiment of the invention has been disclosed, it should be understood that principles are applicable to other embodiments.

What is claimed is:

1. In a variable valve timing system for an automobile engine wherein a camshaft that operates valves associated with cylinders of the engine is adjustably phased relative to the engine's crankshaft by means of a closed-loop control that includes a sensor that senses the phase of the camshaft relative to the phase of the crankshaft, the improvement comprising autocalibration means for enabling the system to automatically calibrate itself such that discrepancies between the true camshaft phasing relative to the crankshaft and the apparent camshaft phasing as determined by said sensor are substantially eliminated, said autocalibration means comprising means defining a zone of operation for said system at a known phase relation to the camshaft wherein a certain commanded adjustment of the camshaft phasing produces no corresponding adjustment of the camshaft phasing and hence no corresponding change in the camshaft phasing indicated by said sensor, comparison means responsive to this lack of response of the camshaft to the commanded adjustment for comparing the phasing of the camshaft that is being concurrently indicated by said sensor with the known phasing of said zone of operation, and modifying means for modifying the indicated camshaft phasing from said sensor by the amount of said comparison to thereby calibrate said sensor.

2. The improvement set forth in claim 1 which said comparison means comprises means for taking the difference between the known camshaft phasing that exists at said zone of operation and the phasing of the camshaft that is being concurrently indicated by said sensor, and for algebraically adding such difference to the phasing of the camshaft that is being concurrently indicated by said sensor to thereby calibrate said sensor.

3. The improvement set forth in claim 1 in which said closed-loop control includes a cam for adjusting the phasing of the camshaft, and said means defining said zone of operation comprises a dwell in said cam.

4. The improvement set forth in claim 1 including means for causing said autocalibration to occur in response to a certain condition of engine operation.

5. The improvement set forth in claim 4 wherein said means for causing autocalibration to occur comprises means for causing autocalibration to occur in response to a closed throttle of the engine.

6. In a variable valve timing system for an automobile engine wherein a camshaft that operates valves associated with cylinders of the engine is adjustably phased relative to the engine's crankshaft by means of a closed-loop control that includes a sensor that senses the phase of the camshaft relative to the phase of the crankshaft, an autocalibration method for enabling the system to automatically calibrate itself such that discrepancies between the true camshaft phasing relative to the crankshaft and the apparent camshaft phasing as determined by said sensor are substantially eliminated, said autocalibration method comprising defining a zone of operation for said system at a known phase relation to the camshaft wherein a certain commanded adjustment of the camshaft phasing produces no corresponding adjustment of the camshaft phasing and hence no corresponding change in the camshaft phasing indicated by said sensor, commanding said system to said zone of operation, responding to the lack of response of the camshaft at said zone of operation by comparing the phasing of the camshaft that is being concurrently indicated by said sensor with the known phasing of said zone of operation, and modifying the indicated camshaft phasing from said sensor by the amount of said comparison to thereby calibrate said sensor.

7. The method set forth in claim 6 in which said comparison step comprises taking the difference between the known camshaft phasing that exists at said zone of operation and the phasing of the camshaft that is being concurrently indicated by said sensor, and algebraically adding such difference to the phasing of the camshaft that is being concurrently indicated by said sensor to thereby calibrate said sensor.

8. The method set forth in claim 6 wherein autocalibration is caused to occur in response to a certain condition of engine operation.

9. The method set forth in claim 8 wherein autocalibration is caused to occur in response to a closed throttle of the engine.

10. In an automobile engine wherein a camshaft that operates valves associated with cylinders of the engine is adjustably phased relative to the engine's crankshaft by means of a variable valve timing system having a closed-loop control that includes a sensor that senses the phase of said camshaft relative to the phase of said crankshaft, the improvement comprising autocalibration means for enabling the system to automatically calibrate itself such that discrepancies between the true camshaft phasing relative to said crankshaft and the apparent camshaft phasing as determined by said sensor are substantially eliminated, said autocalibration means comprising means defining a zone of operation for said system at a known phase relation to said camshaft wherein a certain commanded adjustment of the camshaft phasing produces no corresponding adjustment of the camshaft phasing and hence no corresponding change in the camshaft phasing indicated by said sensor, comparison means responsive to this lack of response of said camshaft to the commanded adjustment for comparing the phasing of said camshaft that is being concurrently indicated by said sensor with the known phasing of said zone of operation, and modifying means for modifying the indicated camshaft phasing from said sensor by the amount of said comparison to thereby calibrate said sensor.

11. The improvement set forth in claim 10 in which said comparison means comprises means for taking the difference between the known camshaft phasing that exists at said zone of operation and the phasing of said camshaft that is being concurrently indicated by said sensor, and for algebraically adding such difference to the phasing of said camshaft that is being concurrently indicated by said sensor to thereby calibrate said sensor.

12. The improvement set forth in claim 10 in which said closed-loop control includes a cam for adjusting the phasing of said camshaft, and said means defining said zone of operation comprises a dwell in said cam.

13. The improvement set forth in claim 10 including means for causing said autocalibration to occur in response to a certain condition of engine operation.

14. The improvement set forth in claim 13 wherein said means for causing autocalibration to occur comprises means for causing autocalibration to occur in response to a closed throttle of the engine.

15. In an automobile engine wherein a camshaft that operates valves associated with cylinders of the engine is adjustably phased relative to the engine's crankshaft by means of a variable valve timing system having a closed-loop control that includes a sensor that senses the phase of said camshaft relative to the phase of said crankshaft, an autocalibration method for enabling the system to automatically calibrate itself such that discrepancies between the true camshaft phasing relative to said crankshaft and the apparent camshaft phasing as determined by said sensor are substantially eliminated, said autocalibration method comprising defining a zone of operation for said system at a known phase relation to said camshaft wherein a certain commanded adjustment of the camshaft phasing produces no corresponding adjustment of the camshaft phasing and hence no corresponding change in the camshaft phasing indicated by said sensor, commanding said system to said zone of operation, responding to the lack of response of said camshaft at said zone of operation by comparing the phasing of said camshaft that is being concurrently indicated by said sensor with the known phasing of said zone of operation, and modifying the indicated camshaft phasing from said sensor by the amount of said comparison to thereby calibrate said sensor.

16. The method set forth in claim 15 in which said comparison step comprises taking the difference between the known camshaft phasing that exists at said zone of operation and the phasing of said camshaft that is being concurrently indicated by said sensor, and algebraically adding such difference to the phasing of said camshaft that is being concurrently indicated by said sensor to thereby calibrate said sensor.

17. The method set forth in claim 15 wherein autocalibration is caused to occur in response to a certain condition of engine operation.

18. The method set forth in claim 17 wherein autocalibration is caused to occur in response to a closed throttle of the engine.

* * * * *